United States Patent [19]
Krenkel et al.

[11] Patent Number: 5,713,621
[45] Date of Patent: Feb. 3, 1998

[54] VEHICLE ROLLING SHUTTER WITH DOOR-AJAR AND COMPARTMENT LIGHT SWITCH

[75] Inventors: Don Krenkel, Kansas City; Clayton Smith, Blue Springs, both of Mo.

[73] Assignee: Rom Corporation, Kansas City, Mo.

[21] Appl. No.: 643,253

[22] Filed: May 3, 1996

(Under 37 CFR 1.47)

[51] Int. Cl.$^6$ ............................ B60J 5/06; B60Q 1/00
[52] U.S. Cl. ............................ 296/24.1; 160/10; 160/127; 160/133; 340/457; 340/547; 362/74
[58] Field of Search ............................ 296/24.1, 155; 160/10, 127, 133, 201, 310; 340/457, 547; 362/74, 80

[56] References Cited

U.S. PATENT DOCUMENTS

| | | | |
|---|---|---|---|
| 2,932,727 | 4/1960 | Larsen | 362/80 |
| 3,975,723 | 8/1976 | Bowling et al. | 340/547 |
| 4,232,309 | 11/1980 | Dillitzer | 340/547 |
| 4,281,320 | 7/1981 | Rosenberg | 340/545 |
| 4,593,491 | 6/1986 | Carlson et al. | 49/13 |
| 4,694,191 | 9/1987 | Segoshi | 362/74 X |
| 5,121,098 | 6/1992 | Chen | 340/457 |
| 5,602,526 | 2/1997 | Read | 340/457 |

*Primary Examiner*—Andrew C. Pike
*Attorney, Agent, or Firm*—Kokjer, Kircher, Bowman & Johnson

[57] ABSTRACT

A vehicle rolling shutter system with magnetic door-ajar and compartment light switch. In combination with a vehicle, the rolling shutter system has a roller shutter, constructed of a number of interconnected links, for movement along guide rails positioned at opposing sides of an access opening to a cargo compartment of the vehicle. A lamp, for illuminating the cargo compartment, is positioned within the cargo compartment. An indicator lamp is positioned on a dashboard of the vehicle. The roller shutter has a lift bar which is mounted by mounting members to a lower portion of the roller shutter. The lift bar engages with strike blocks, positioned at opposing sides of the access opening to the cargo compartment, for retaining the roller shutter in a closed position. At least one of the strike blocks contains a magnetic switch element connected to the lamps. A magnet is positioned within a corresponding end of the lift bar, to cooperate with said magnetic switch and to keep the magnetic switch in an open position when the roller shutter is closed and the lift bar is engaged with the strike block. Disengaging the lift bar from the strike block, upon opening of the roller shutter, removes a magnetic field associated with the magnet from the proximity of the magnetic switch, thereby causing the magnetic switch to close, thus sending electrical current to the lamps for respectively illuminating the compartment and providing an indication that the door is ajar.

17 Claims, 2 Drawing Sheets

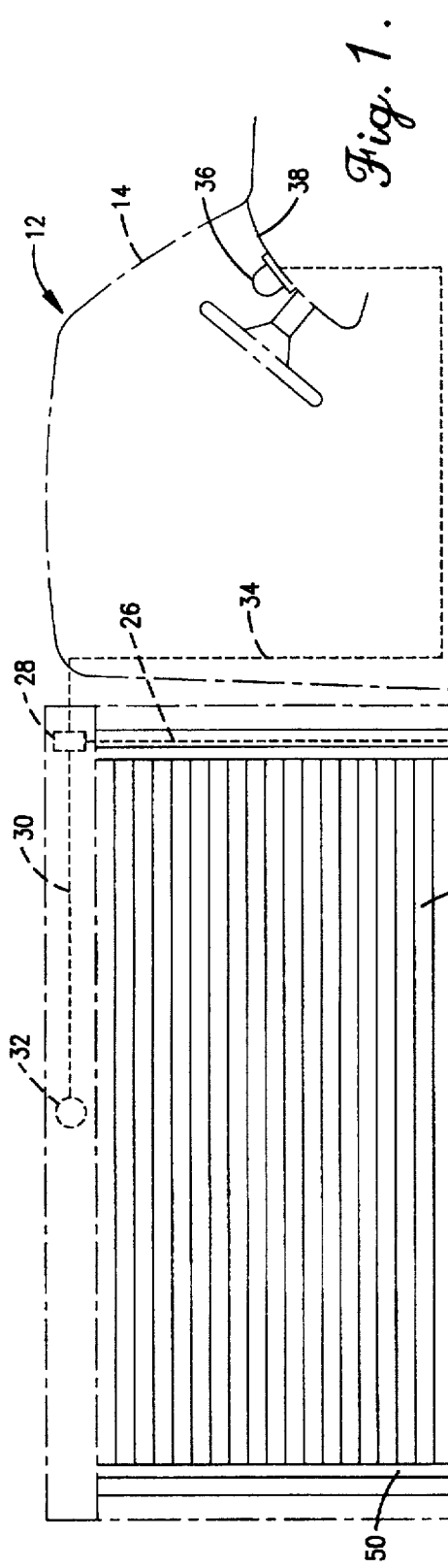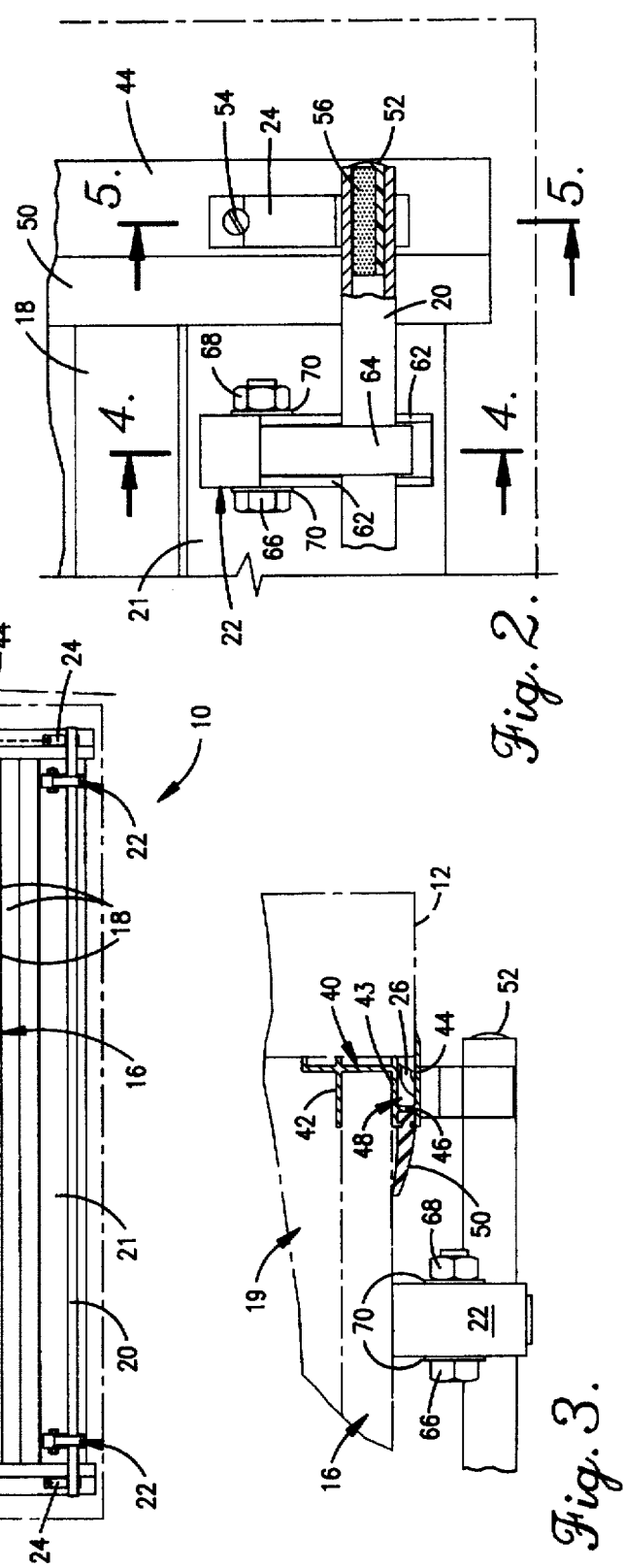

VEHICLE ROLLING SHUTTER WITH DOOR-AJAR AND COMPARTMENT LIGHT SWITCH

BACKGROUND OF THE INVENTION

The present invention is very generally directed to a rolling shutter for use to open and close compartments on the side of vehicles, such as fire and utility trucks. More particularly, the present invention is directed to such a rolling shutter having a magnetic switch which, when the shutter is opened, activates a lamp on the dashboard of the vehicle to indicate that the shutter door is ajar and also activates one or more lamps (for providing visibility) in the compartment.

Various types of rolling shutters for opening and closing compartments on vehicles are currently available. Such shutters are typically aligned to roll upwardly and downwardly over an opening to the compartment of the vehicle. Many of these shutters utilize a mechanical switch for activating one or more lights for providing visibility within the compartment, and also for activating an indicator light on the dashboard of the vehicle, indicating when the door is ajar.

One known type of shutter utilizes a mechanical switch located at the bottom of the compartment in the plane of the shutter door such that, when the shutter door is closed, the button is depressed by the weight of the shutter door. When the shutter door is rolled upwardly, the button correspondingly pops upwardly, thereby activating a compartment light and an indicator light on the dashboard of the vehicle. Another type of mechanical switch utilized with vehicle shutters includes a toggle switch extending from the side of the compartment, and a member protruding from the rolling shutter, such that the protruding member triggers the toggle switch in an appropriate manner when the door is opened and closed.

Such prior art mechanical switches experience numerous problems. For instance, the mechanical switches are subject to wear, particularly in the harsh environment of a vehicle compartment. Additionally, when the vehicle goes over bumps, it is common for the mechanical switches to be vibrated, often activating the switch and thus providing an indication to the driver that the door is ajar, when perhaps it is not. Furthermore, the mechanical switches are often bumped, and even destroyed, as items are placed into, or taken from, the vehicular compartment. Additionally, mechanical switches are adversely affected by exposure to moisture and other elements.

In Order to overcome the drawbacks of the prior art, the present invention provides a rolling shutter for a vehicle having a magnetic switch for activating a compartment lamp and dash light indicator. Magnetic switches have been used in conjunction with rolling shutters such as garage doors and the like, for activating an alarm upon unauthorized opening of the door. U.S. Pat. No. 4,232,309 (Dillitzer) shows a rolling shutter having a magnetic switch. An alarm is actuated by the magnetic switch during an unauthorized lifting of the closed roller shutter. U.S. Pat. No. 4,281,320 (Rosenberg) shows a window shade which is combined with a burglar alarm system. A magnetic reed switch is utilized in a lower part of the blind such that, if the blind is lifted, thereby moving the reed switch away from a respective magnetic element, the reed switch will open to interrupt electrical current, thereby actuating an alarm. Those prior art devices which utilize magnetic switches in conjunction with alarms have not heretofore been used, and are not suitable for use, in combination with vehicular rolling shutters.

Accordingly, the need exists for a reliable rolling shutter, having a magnetic switch assembly, for vehicles. Moreover, the need exists for a rolling shutter system for vehicles having a compartment lamp and a door-ajar indicator lamp, each of which is illuminated when the shutter is opened and is turned off when the shutter is closed. The present invention overcomes the drawbacks of the prior art, and fills these and other needs.

SUMMARY OF THE INVENTION

It is an object of the present invention to provide a reliable and inexpensive vehicular rolling shutter having a magnetic switch to actuate one or more lights.

It is an object of the present invention to provide a rolling shutter, having a magnetic switch assembly, on a vehicle.

It is a further object of the present invention to provide a rolling shutter having a waterproof and temperature-resistant magnetic switch.

It is an additional object of the present invention to provide a reliable vehicular rolling shutter with door-ajar and compartment light switch, which switch is an improvement over mechanical switches utilized in the prior art.

It is a principal object of the present invention to provide a rolling shutter system for covering an opening to an enclosed area on a vehicle, wherein the rolling shutter system has a pair of opposed guide rails, a roller shutter for movement along the guide rails, a lamp positioned on the vehicle, and a magnetic switch, located externally of the enclosed area, including a magnet, having a magnetic field and moveable in cooperation with movement of the rolling shutter, wherein the magnetic field maintains the switch in an open position when the roller shutter is in a closed position and the switch closes upon removal of the magnetic field from the proximity of the switch, such removal corresponding to an opening of the roller shutter, thereby causing the lamp to illuminate.

These and other objects are achieved by a rolling shutter system, for a vehicle, having a magnetic switch. The system has a roller shutter including a lift bar positioned near its lower end. A small magnet is placed in one or both ends of the lift bar, which ends correspond to opposite sides of the vehicular compartment. Each side of the compartment has a catching member, sometimes referred to herein as a strike block, adapted to engage respective outer ends of the lift bar. The catching member is preferably plastic, having a cavity therein. An electronic reed switch is embedded into place within the cavity by an epoxy.

The roller shutter is adapted to roll upwardly and downwardly, to respectively open and close the compartment of a vehicle. A lamp, for illuminating the compartment, is positioned within the compartment. An indicator light, for indicating when the roller shutter is open, is located within view of the vehicle operator, such as on the dashboard of the vehicle. In operation, when the lift bar engages with the catching member, the magnetic field of the magnet within the lift bar is detected by the electronic reed switch within the strike block and causes the switch to remain open, thereby preventing the flow of electricity to the lamp and the indicator light. However, when the lift bar is grasped and the rolling shutter is rolled upwardly, the lift bar disengages with the catching block. Upon removing the magnet from the proximity of the electronic reed switch, the reed switch closes, thereby creating a closed circuit and allowing electricity to flow to the illuminating lamp within the compartment, as well as the door-ajar indicator light at the dashboard of the vehicle. Upon closing of the rolling shutter, the lift bar is again engaged with the catching member, and the magnetic field present in the vicinity of the electronic reed switch causes the reed switch to open once again, thereby resulting in the compartment lamp and door-ajar indicator lamp being turned off.

BRIEF DESCRIPTION OF THE DRAWINGS

The objects and features of the invention noted above are explained in more detail with reference to the drawings, in which like reference numerals denote like elements, and in which:

FIG. 1 is a side elevational view of a vehicle having a rolling shutter system of the present invention;

FIGS. 2 and 3 are fragmentary views illustrating various components of the rolling shutter system of the present invention;

DETAILED DESCRIPTION OF THE INVENTION

Figure 4:
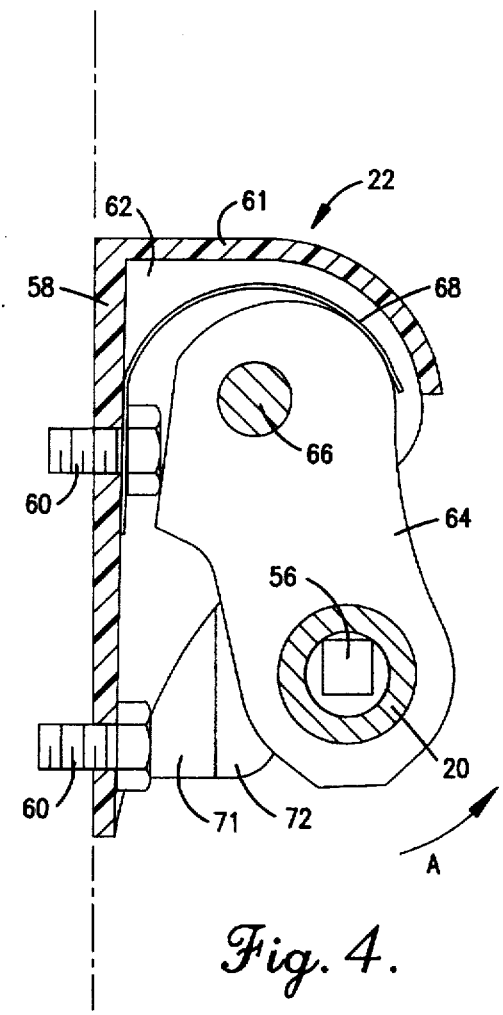
FIGS. 4 and 5 are cross-sectional views, taken along lines 4—4 and 5—5, respectively, illustrating various components of the rolling shutter system of the present invention.

With reference initially to FIG. 1, the rolling shutter system of the present invention is denoted generally by the reference numeral 10. Rolling shutter system 10 is shown in a closed position, covering an opening to a cargo compartment on vehicle 12, having an operator cab 14. It will be understood that vehicle 12 may be various types of panel trucks which utilize cargo compartment, including, for example, fire trucks and other emergency vehicles having cargo compartments.

Rolling shutter system 10 has a roller shutter 16 formed of a number of interconnected links 18. A lift bar 20 is mounted to an enlarged lower link member 21 by mounting members 22. Lift bar 20 engages with catching members 24, positioned at opposed sides of the compartment opening, to hold roller shutter 16 in its closed position.

As described more fully below, a switch embedded within catching member 24 is connected by wire 26 to a relay 28, which in turn is coupled by wire 30 to compartment illuminating lamp 32 and by wire 34 to an indicator lamp 36. Compartment illuminating lamp 32 is positioned within the cargo compartment 19 of vehicle 12 for illuminating the compartment. Door-ajar indicator lamp 36 is shown in an enlarged manner for illustrative purposes, and is positioned on a dashboard 38 within operator cab 14 of vehicle 12.

With additional reference now to FIGS. 2 and 3, roller shutter 16, in its closed position, covers an opening to cargo compartment 19. Roller shutter 16 is received at opposing sides of the opening to compartment 19 by a guide rail 40, having first and second outwardly extending flanges 42, 43 for receiving a respective outer side edge of roller shutter 16. The operation of a rolling shutter will be readily appreciated by those skilled in the art, and it will be understood that the roller shutter 16 may be rolled upwardly from its closed position along guide rails 40 to reveal the interior of compartment 19.

Guide rail 20 also has a front plate 44 separated by a separating bar 46, thereby forming a channel 48. Front plate 44 extends outwardly over a small portion of vehicle 12. Wire 26 is received within channel 48. Lift bar 20, utilized for lifting and lowering roller shutter 16, is mounted to roller shutter by mounting members 22. Catching members 24 engage lift bar 20 to hold roller shutter 16 in a closed position, as will be described in greater detail below. Lift bar 20 has a plug 52 inserted in each end thereof. A flexible runner 50, preferably made of rubber, extends inwardly from guide rail 40 to cover an outer side portion of roller shutter 16.

Catching member 24 is secured to front plate 44 of guide rail 40 by a fastener 54. Plug 52 has a hollow portion which receives a magnet 56, thereby positioning magnet 56 proximate an outer end of lift bar 20.

With additional reference to FIG. 4, a cross-sectional view taken along line 4—4 of FIG. 3, mounting member 22 is shown and described in greater detail. Mounting member 22 mounts lift bar 20 onto a lower link 21 of roller shutter 16. Mounting member 22 has a rear wall portion 58 fastened to lower link member 21 of roller shutter 16 by fastener 60. Mounting member 22 also has a hooded portion 61, which extends at least partially over a pivot block 64, and side wall portions 62 (only one of which is shown in this cross-sectional view) dimensioned so as to surround outer side surfaces of an upper portion of pivot block 64, but tapering inwardly to meet with a lower end of rear wall 58. Pivot block 64 is pivotally mounted to side walls 62 of mounting member 22 by a bolt 66. As shown in FIGS. 2 and 3, bolt 66 extends through mounting member 22 and is held in place by a nut 68. Washers 70 are preferably utilized in a known manner.

A metallic spring clip 68 is mounted within mounting member 22, by fastener 60, and extends outwardly from rear wall 58 and over pivot block 64 to a position in engagement with an upper, outer portion of pivot block 64. Spring clip 68 serves to resiliently bias spring block 64 into a position shown in FIGS. 4 and 5. As shown, lift bar 20, having a magnet 56 positioned at least one end thereof, extends through a lower portion of pivot block 64. By pulling upwardly and outwardly, in the general direction of arrow A, pivot block 64 will pivot against the bias of spring clip 68 in the general direction of arrow A, to a second position. Upon release of the lift bar 20, the spring clip 68 will force the pivot block back into its initial position, as shown in FIG. 4.

Figure 5:
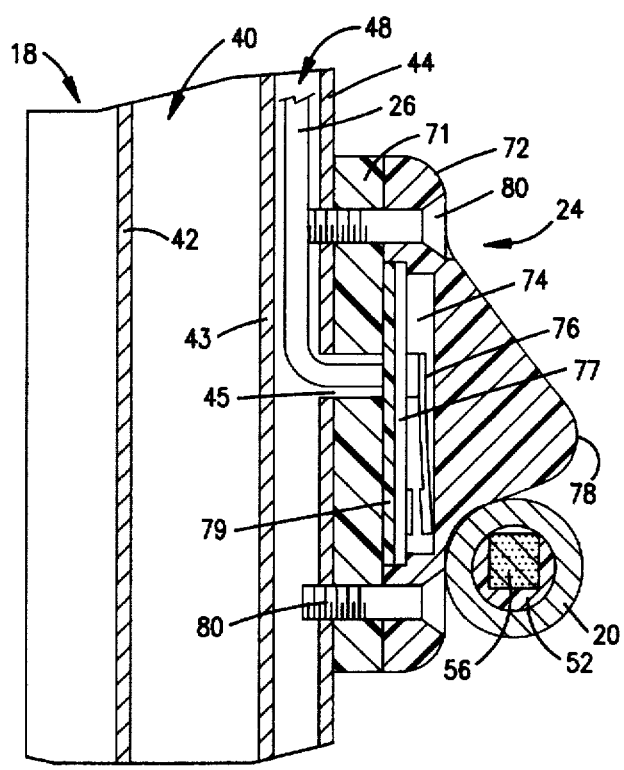

Turning now to FIG. 5, a view taken along line 5—5 of FIG. 2, catching member 24 is shown and described in detail. Catching member 24 is also known as a strike block, due to the fact that an outermost portion of lift bar 20 strikes an upper portion of mounting member 24 as roller shutter 16 is moved to a closed position. Catching member 24 has a shim 71 (optionally used) and an outer strike block member 72 configured so as to slope downwardly to an outwardly extending nose portion 78. Strike block member 72 has an internal cavity 74 for housing an electronic reed switch 76, shown schematically positioned on a circuit board 77. The circuit board 77 (containing switch 76) is embedded into place within cavity 74 by an epoxy 79. Fasteners 80 are positioned through strike block member 72 and shim 71 for holding mounting member 24 in place on front plate 44 of guide rail 40. As shown, front plate 44 of guide rail 40 has an opening 45 through which wire 26 extends into channel 48. As shown in FIG. 5, when roller shutter 16 is in a closed position, lift bar 20 is engaged beneath the outwardly protruding nose portion 78 of mounting member 24. Spring clip 68 biases the pivot block 64 inwardly into engagement with strike block member 72, such that mounting member 22 and catching member 24 cooperate to resist opening of roller shutter 16.

In operation, roller shutter 16 is rolled upwardly and downwardly along guide rails 40 at opposing side edges of the opening to compartment 19, to respectively open and close compartment 19. As shown in FIGS. 1-5, when roller shutter 16 is in its completely closed position, lift bar 20 is engaged beneath the outwardly extending nose portion 78 of mounting member 24, with spring clip 68 biasing the pivot block inwardly towards the mounting member 24. Magnet 56, located in the outer end of lift bar 20, has a magnetic field, or flux, which maintains switch 76 in an open position when roller shutter 16 is in its closed position with lift bar 20 is in its corresponding position in engagement with catching member 24. To open compartment 19, roller shutter 16 is rolled upwardly by lifting lift bar 20, in the general direction of arrow A in FIG. 4. Such movement of lift bar 20 causes pivot block 64 to pivot outwardly, against the bias of spring clip 68, sufficiently to permit lift bar 20 to pass about the outwardly protruding nose portion 78 of catching member 24, at which point roller shutter 16 is unprohibited from rolling upwardly. As will be appreciated by those skilled in art, in some embodiments, roller shutter 16 may include a tension assembly which assists upward movement of roller shutter 16.

In accordance with an important principal of the present invention, as a result of the lift bar being moved from its resting position in the manner described, the magnetic field surrounding magnet 56 is similarly drawn away from switch 76, thereby causing the switch to close. Preferably, the magnetic field is of a strength such that the switch 76 will completely close at approximately the point that the lift bar 20, and hence magnet 56, passes about the outwardly protruding nose portion 78 of mounting member 24.

Specifically, the magnetic switch 76 is maintained in an open position by the magnetic flux of the magnet 56 in the lift bar 20. When the roller shutter 16 is closed, and the lift bar 20 is fully engaged under the strike block 72, the switch 76 is in an open condition and no electrical current flows. However, when the roller shutter is opened, and the lift bar 20, having the magnet 56 therein, is thus disengaged from the strike block 72, the switch 76 closes, activating relay 28. The relay outputs are then utilized to power the compartment illuminating lamp 32 and the door-ajar indicator lamp 36. As roller shutter 16 is closed, lift bar 20 will strike an upper portion of catching member 24 and then, against the bias of spring clip 68, will be forced outwardly as the lift bar proceeds downwardly along the sloped portion of the strike block member 72. As the lift bar 20 passes about the outwardly extending nose portion 78 of the strike block member 72, and into engagement beneath the nose portion, the magnetic flux of the magnet 56 within the lift bar 20 causes the switch to return to an open position, thereby ceasing current flow to the relay 28 and, hence, the lamps 32, 36. Thus, when roller shutter 16 is closed, lamps 32 and, 36 are off, whereas when roller shutter 16 is opened, lamps 32 and 36 are illuminated.

Figure 6:
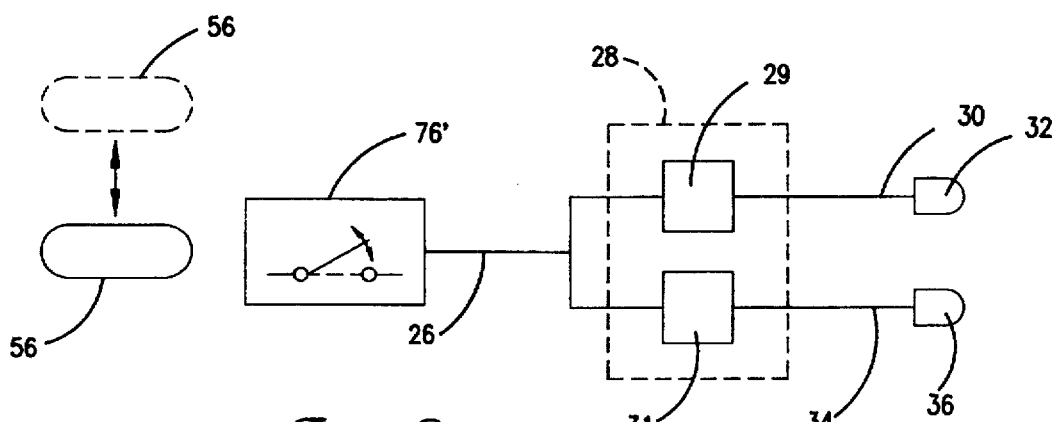
FIG. 6 is a block diagram illustrating the electrical components of the present invention.

FIG. 6 shows a block diagram of the electrical components of the present invention. Block 56 represents magnet 56 in the outer end of lift bar 20, and is, as described, moveable between a position corresponding to a closed roller shutter, as shown in solid lines, and a position corresponding to an open roller shutter 16, as represented by broken lines. Block 76' represents switch 76 and, as shown, the switch is in an open position when magnet 56 is in proximity thereto, such as when lift bar 20 is engaged with catching member 24, whereas the switch is in a closed position when roller shutter 16 is opened and flux from magnet 56 is thus removed from the proximity of switch 76. Electronic switch 76 is coupled by wire 26 to relay 28, which includes a first relay member 29 and a second relay member 31. The first relay member 29 has an output connected by wire 30 to illuminating lamp 32 positioned within the cargo compartment 19 of vehicle 12. Second relay member 31 has an output connected by wire 34 to indicator lamp 36, located on the dashboard 38 of vehicle 12.

It will be appreciated that numerous variations can be made to the present invention without departing from the principals of the invention. For instance, although the preferred embodiment of the invention positions the magnet 56 on the lift bar 20, it will be understood that it is necessary only for the magnet 56 to cooperate with the magnetic switch 76, and that the magnet 56 and magnetic switch 76 be moveable in relation to each other corresponding to movement of the roller shutter 16. In this regard, rather than having the magnet 56 on the roller shutter 16, the present invention could be constructed so that the magnet 56 is fixedly mounted at the periphery of the opening to the cargo compartment 19, and that the magnetic switch 76 is mounted on the roller shutter 16. Furthermore, it should be understood that the position of the magnet 56 and magnetic switch 76 could be located somewhere other than at a lowermost part of the roller shutter 16. In this regard, another convenient location for the location of the magnet 56 and magnetic switch 76 is proximate the top of the roller shutter 16. Furthermore, although it is a preferred embodiment of the present invention to utilize the magnetic switch 76 of the present invention to activate and deactivate either a compartment lamp 32 for illuminating the compartment 19 or an indicator lamp 36 on the dashboard 38 of the vehicle 12 for indicating that the roller shutter 16 is ajar, or both, it should be understood that other indicator means, such as a horn, buzzer, or bell, could be utilized in conjunction with a magnetic switch 76 to audibly indicate that the roller shutter 16 is ajar or to deter unauthorized access into the cargo compartment 19.

The present invention provides a highly useful and unique rolling shutter system having a magnetic door-ajar lamp and compartment lamp switch. Because electronic switch 76 is embedded and sealed within cavity 74 of catching member 24, it is sealed from the harsh effects of the environment and it is fixed in a very stable manner relative to the vibration experienced by vehicle 12 as it is moving over a rough, bumpy surface. Additionally, the utilization of the magnetic switching elements of the present invention provide a highly reliable device. Moreover, the location of switch 76 and magnet 56 externally of the compartment 19 prevent damage of the switch 76 during loading and unloading of the compartment 19.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A rolling shutter system, in combination with a vehicle having a cargo compartment with an opening thereto, said system comprising:

a pair of opposed guide rails;

a roller shutter for movement along said guide rails and for covering said opening to said cargo compartment when in a closed position;

a lamp;

a lift bar mounted on said roller shutter proximate a lower edge of said roller shutter;

a catching member, fixedly positioned on said vehicle proximate a side edge of said cargo compartment, for engaging with said lift bar to retain said roller shutter in the closed position; and a magnetic switch comprised of a switching element and a magnetic element, said magnetic element having a magnetic field, wherein one of said switching element and said magnetic element is positioned at said lift bar and another of said switching element and said magnetic element is located at said catching member, wherein said magnetic switch is operable to turn said lamp on when said roller shutter is in an opened position and to turn said lamp off when said roller shutter is in the closed position.

2. The rolling shutter system as set forth in claim 1, wherein said lamp is positioned within said compartment for providing illumination to said compartment.

3. The rolling shutter system as set forth in claim 1, wherein said lamp is positioned within an operator cab for providing a visual indication of the opened or closed position of said roller shutter.

4. The rolling shutter system as set forth in claim 1, wherein said lamp comprises a first lamp located in said storage compartment, said system further comprising:

a second lamp located in an operator cab;

a first relay for connecting said magnetic switch to said first lamp; and a second relay for connecting said magnetic switch to said second lamp, wherein each said lamp is illuminated upon separation of said magnetic field from said switching element.

5. The rolling shutter system as set forth in claim 1, further comprising:

mounting structure for mounting said lift bar on said roller shutter, said mounting structure comprising a pivot block attached to the lift bar for pivoting between first and second positions; and a spring members biasing said pivot block and attached lift bar to bring the lift bar into engagement with said catching member when said roller shutter is in the closed position.

6. The rolling shutter system as set forth in claim 5 wherein said catching member has a downwardly sloped portion terminating in an outwardly extending nose, and wherein said lift bar engages with said catching member beneath said nose.

7. The rolling shutter system as set forth in claim 1 wherein said magnetic field maintains said switching element in an open position when said roller shutter is in the closed position, and wherein said switching element closes when one of said switching element and said magnetic element is moved so that said switching element is not within said magnetic field.

8. The rolling shutter system as set forth in claim 1, wherein said magnetic element is located in said lift bar and said switching element is embedded within said catching member.

9. The rolling shutter system as set forth in claim 1, wherein said lift bar is located proximate a lower portion of said roller shutter.

10. The rolling shutter system as set forth in claim 9 wherein said catching member is located proximate said lower portion of said roller shutter when said roller shutter is in the closed position.

11. A rolling shutter system, for covering an opening to an enclosed area, said system comprising:

a pair of opposed guide rails;

a roller shutter for movement along said guide rails and for covering said opening to said enclosed area when in a closed position;

an indicator;

a lift bar mounted on said roller shutter proximate a lower edge of said roller shutter;

a catching member, fixedly positioned proximate a side edge of said enclosed area, for engaging with said lift bar to retain said roller shutter in the closed position; and a magnetic switch comprised of a switching element and a magnetic element, said magnetic element having a magnetic field, wherein one of said switching element and said magnetic element is positioned at said lift bar and another of said switching element and said magnetic element is located at said catching member, wherein said magnetic switch is operable to turn said indicator on when said roller shutter is in an opened position and to turn said indicator off when said roller shutter is in the closed position.

12. The system according to claim 11, wherein the indicator comprises an indicator lamp.

13. The system according to claim 11, wherein one of the switching element and the magnetic element is in the lift bar and another of the switching element and the magnetic element is in the catching member.

14. The system according to claim 11, wherein the magnetic element comprises a magnet.

15. The system according to claim 11, wherein the magnetic element is in the lift bar and the switching element is in the catching member.

16. The system according to claim 11 further comprising a lamp inside the enclosed area and wherein the magnetic switch is operable to turn the lamp on when the roller shutter is in the opened position and to turn the lamp off when the roller shutter is in the closed position.

17. A rolling shutter system, in combination with a vehicle having a cargo compartment with an access opening defined by a periphery having side walls, said rolling shutter system comprising:

a pair of guide rails, each said guide rail of said pair being positioned on one of said side walls defining said opening to said cargo compartment of said vehicle, each said guide rail having a front plate exposed at an exterior of said vehicle;

a roller shutter, for movement along said guide rails, said roller shutter being comprised of a plurality of interconnected links and having an enlarged, lowermost link;

a lamp on said vehicle;

a pair of strike blocks, each said strike block being fixedly located on a respective one of said front plates of said guide rails, each said strike block having a downwardly sloped portion terminating in an outwardly protruding nose;

a magnetic switch element connected to said lamp and embedded in at least one of said strike blocks, said magnetic switch element opening when subjected to a magnetic field of at least a predetermined strength and closing when not subjected to a magnetic field of at least said predetermined strength;

a lift bar, comprised of an elongate rod member, having at least one end which is hollow;

an end cap, having a channel therein;

a magnet, having a magnetic field of at least said predetermined strength for opening said magnetic switch element, positioned in said channel of said end cap, wherein said end cap is positioned in said at least one hollow end of said lift bar; and a pair of mounting members, mounted in spaced relationship on said enlarged, lowermost link of said roller shutter, each said mounting member comprising:

a rear surface fastened to said enlarged, lowermost link of said roller shutter and a pair of spaced-apart, opposing side panels;

a pivot block pivotally mounted at an upper portion thereof between said side panels of said mounting member, wherein said lift bar is retained by said mounting member at a lower portion of said pivot block; and a spring clip, attached to said rear surface of said mounting member and engaging said pivot block, for resiliently biasing said lower portion of said pivot block towards said rear surface of said mounting member;

wherein said end of said lift bar has said magnet positioned therein and is oriented to cooperate with the at least one of said strike blocks having said magnetic switch element embedded therein, and wherein each said strike block engages said lift bar beneath said nose of each said strike block when said roller shutter is in a closed position, to thereby retain said roller shutter in the closed position, and wherein said lift bar is moveable against the biasing of said spring clips to pivot said pivot blocks outwardly to permit said lift bar to be lifted and moved outwardly about said nose of each said strike block to lift said roller shutter, and wherein said magnet in said lift bar maintains said magnetic switch element in an open position when said lift bar is engaged beneath said strike blocks, and wherein said magnetic switch element closes upon removal of said lift bar, containing said magnet, from engagement with said strike blocks, and wherein said closing of said magnetic switch element sends electric current to said lamp on said vehicle to thereby illuminate said lamp.

* * * * *